US008903608B2

(12) United States Patent
Niemz et al.

(10) Patent No.: US 8,903,608 B2
(45) Date of Patent: Dec. 2, 2014

(54) METHOD FOR ASSISTING A DRIVER OF A MOTOR VEHICLE

(75) Inventors: Volker Niemz, Rutesheim (DE); Andreas Gruetzmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 13/811,579

(22) PCT Filed: Jun. 1, 2011

(86) PCT No.: PCT/EP2011/059094
§ 371 (c)(1),
(2), (4) Date: Apr. 1, 2013

(87) PCT Pub. No.: WO2012/010365
PCT Pub. Date: Jan. 26, 2012

(65) Prior Publication Data
US 2013/0184925 A1   Jul. 18, 2013

(30) Foreign Application Priority Data

Jul. 22, 2010   (DE) .................. 10 2010 031 672

(51) Int. Cl.
*A01B 69/00* (2006.01)
*B60W 30/09* (2012.01)
*B62D 15/02* (2006.01)
*G05D 1/00* (2006.01)
*G08G 1/16* (2006.01)
*B60W 50/14* (2012.01)
*B60W 30/06* (2006.01)

(52) U.S. Cl.
CPC ........ *G05D 1/0061* (2013.01); *B60W 2050/146* (2013.01); *B60W 50/14* (2013.01); *B60W 2050/143* (2013.01); *B60W 30/09* (2013.01); *B62D 15/028* (2013.01); *B60W 2550/141* (2013.01); *G08G 1/16* (2013.01); *B60W 2550/10* (2013.01); *B60W 2540/18* (2013.01); *B60W 30/06* (2013.01)
USPC .................. 701/41; 701/25; 701/301

(58) Field of Classification Search
CPC ..... B60W 30/06; B60W 30/09; B60W 50/14; B60W 2050/143; B60W 2050/146; B60W 2550/10; B60W 2550/141; B60W 2540/18; G05D 1/0061; B62D 15/028; G08G 1/16
USPC .............................................. 701/25, 41, 301
See application file for complete search history.

(56) References Cited

U.S. PATENT DOCUMENTS 8,521,364 B2 * 8/2013 Hueger et al. .................. 701/41
2003/0150661 A1 * 8/2003 Kataoka et al. ............... 180/204
(Continued)

FOREIGN PATENT DOCUMENTS

DE      196 48 943      6/1997
DE   10 2004 046589    2/2006
(Continued)

*Primary Examiner* — Hussein A. Elchanti
(74) *Attorney, Agent, or Firm* — Kenyon & Kenyon LLP

(57) ABSTRACT

A method for assisting a driver of a vehicle in a driving maneuver in which the vehicle is guided automatically along a previously calculated trajectory, or the lateral guidance for travel along the trajectory is carried out automatically, and after the driving maneuver is completed, the steering of the vehicle is returned to the driver, information being provided to the driver concerning the vehicle's surroundings and suitable steering settings before and/or during the transfer of the steering to the driver. Also described is a device for carrying out the method, including a steering arrangement for steering the vehicle along a previously calculated trajectory as well as an output arrangement for outputting information concerning the vehicle's surroundings and suitable steering settings to the driver before and/or during the transfer of the steering to the driver.

10 Claims, 1 Drawing Sheet

(56) References Cited

U.S. PATENT DOCUMENTS

| | | |
|---|---|---|
| 2007/0279199 A1 | 12/2007 | Danz et al. |
| 2008/0009990 A1 | 1/2008 | Katoh et al. |
| 2008/0306666 A1 | 12/2008 | Zeng et al. |
| 2009/0187313 A1* | 7/2009 | Kawakami et al. ............. 701/45 |
| 2009/0259365 A1* | 10/2009 | Rohlfs et al. .................... 701/41 |
| 2010/0010715 A1 | 1/2010 | Inoue |
| 2010/0235053 A1* | 9/2010 | Iwakiri et al. ................... 701/42 |
| 2011/0054739 A1* | 3/2011 | Bammert et al. ............... 701/41 |
| 2011/0057813 A1* | 3/2011 | Toledo et al. ............. 340/932.2 |
| 2011/0080304 A1* | 4/2011 | Toledo et al. ............. 340/932.2 |
| 2011/0128140 A1* | 6/2011 | Pampus et al. ................ 340/465 |
| 2011/0260887 A1* | 10/2011 | Toledo et al. ............. 340/932.2 |
| 2012/0072067 A1* | 3/2012 | Jecker et al. .................... 701/25 |
| 2012/0287279 A1* | 11/2012 | Tanaka et al. ................. 348/148 |
| 2013/0038715 A1* | 2/2013 | Ichikawa ....................... 348/118 |

FOREIGN PATENT DOCUMENTS

| | | |
|---|---|---|
| DE | 10 2007 029773 | 12/2008 |
| DE | 10 2008 003 662 | 7/2009 |
| DE | 10 2010 001 368 | 8/2011 |
| JP | 2003-306105 | 10/2003 |
| JP | 2007-320433 | 12/2007 |
| JP | 2007 326414 | 12/2007 |
| JP | 2008302711 | 12/2008 |
| JP | 2010-18148 | 1/2010 |
| WO | 2009/121534 | 10/2009 |

* cited by examiner

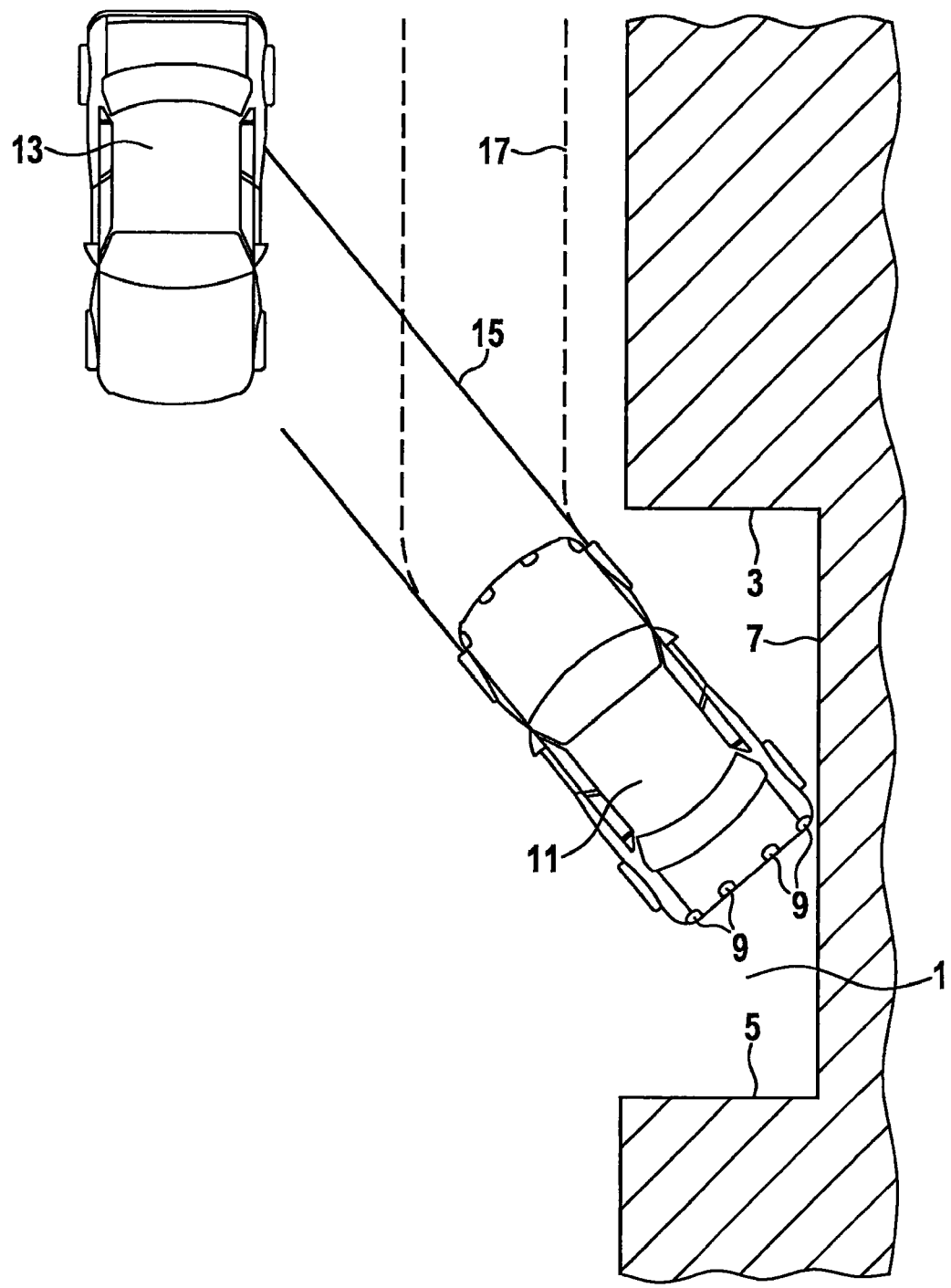

METHOD FOR ASSISTING A DRIVER OF A MOTOR VEHICLE

FIELD OF THE INVENTION

The present invention is directed to a method for assisting a driver of a motor vehicle in a driving maneuver. Furthermore, the present invention also relates to a device for carrying out the method.

BACKGROUND INFORMATION

In the case of methods and systems that assist the driver in driving maneuvers, a distinction is made between pure distance-measuring systems, semi-automatic systems and fully automatic systems. In the case of the distance-measuring systems, the surroundings of the vehicle are detected and the distance to objects in the surroundings of the vehicle is displayed to the driver. Further assistance for suitable steering angle changes for carrying out the driving maneuver are not provided to the driver.

In the case of semi-automatic systems, the detected surroundings are used for calculating a suitable trajectory, along which the driving maneuver, for example, a maneuver of entering or leaving a parking space, may be carried out. For driving along the trajectory, the driver is provided steering instructions, the driver still steers the vehicle independently and also carries out the longitudinal movement of the vehicle independently, i.e., braking, accelerating and maintaining speed. In addition to these systems, systems are also known in which the system takes over the steering. In this case, the driver's only responsibility is the longitudinal guidance of the vehicle.

In contrast, in the case of fully automatic systems, the system takes over both the longitudinal guidance as well as the lateral guidance, i.e., the steering of the vehicle, and the driver has only a monitoring function.

A method and a device for assisting a driver of a vehicle when maneuvering out of a parking space is discussed, for example, in WO-A 2009/121534. In this case, the length of the parking space is initially measured and a trajectory for maneuvering out of a parking space is calculated based on the data obtained by the measurement. Subsequently, the vehicle is moved automatically along the trajectory for maneuvering out of the parking space. To avoid a collision with objects adjacent to the parking space, the distance to objects adjacent to the parking space is monitored during the maneuver out of the parking space. As soon as the vehicle is in a position which makes it possible to maneuver out of the parking space without a collision, the automatic process of maneuvering out of a parking space is terminated.

A disadvantage of this method is, however, that at the point in time of the transfer after termination of the automatic control, an arbitrarily even very large steering angle may be set, which may cause the driver to move the vehicle too rapidly after the transfer while retaining the steering angle, and the risk exists of a collision with, for example, the oncoming traffic.

SUMMARY OF THE INVENTION

To avoid collisions with vehicles of the oncoming traffic, for example, due to the inattentiveness of the driver or caused by lack of understanding of the system by the driver, and for preventing such collisions, in the method according to the present invention for assisting a driver of a motor vehicle in a driving maneuver in which the vehicle is guided automatically along a previously calculated trajectory or the lateral guidance for travel along the trajectory is carried out automatically, and after the driving maneuver is completed, the steering of the vehicle is returned to the driver, information concerning the surroundings of the vehicle and suitable steering settings being provided to the driver before and/or during the transfer of the steering to the driver.

By informing the driver of the vehicle concerning the surroundings of the vehicle and providing suitable steering settings to the driver, the driver is enabled to continue to move the vehicle on an optimal trajectory after the automatic driving maneuver is completed. In particular if the driving maneuver is a maneuver out of a longitudinal parking space which is aligned parallel to a traveled street, the information may be used to prevent the driver from accelerating too rapidly with a sharp steering angle and thus encountering possible oncoming traffic. The output of the steering information also makes it possible for the vehicle to continue to be moved by the driver along the optimal trajectory for merging into the traffic even after the automatic driving maneuver is completed.

In one preferred specific embodiment, the driver of the vehicle receives a warning if the steering angle selected by him during the transfer of the steering would result in endangering the surroundings. An endangerment of the surroundings in this case is to be understood in particular as the collision with objects in the vehicle's surroundings. Such objects in the vehicle's surroundings are, for example, additional vehicles participating in the road traffic, this being understood to include both double-track motor vehicles such as cars or trucks as well as single-track motor vehicles such as bicycles or motorcycles. Further objects that may be endangered are, for example, walls, flower pots or plants adjacent to a parking space or a roadway as well as persons participating in the road traffic, for example, pedestrians.

To be able to warn the driver, the surroundings continue to be detected during the driving maneuver and the distance to objects in the surroundings is displayed to the driver of the vehicle. In addition, the driver receives information concerning the instantaneous steering angle, so that the driver is precisely warned concerning the direction of the steerable wheels of the vehicle and in which direction the vehicle will thus move in continued travel.

To prevent the driver of the vehicle from intervening too early in the maneuver of leaving the parking space, or alternatively to prevent the vehicle from remaining too long in an unfavorable position until the driver takes over the steering of the vehicle, it is further advantageous if the driver is informed when the transfer of the steering takes place. The information to the driver may be provided, for example, visually or acoustically. For example, it is possible that the driver receives acoustic notification that the steering is being transferred. The appropriate information may also be output on an appropriate visual display in a suitable display element in the range of vision of the driver, for example, a monitor of a navigation system. In this connection, it is further advantageous if, in addition to the information that the steering is being transferred, information also appears that the driver must take note of the traffic flow.

So that the driver is able to continue to move the vehicle along an optimal trajectory after the transfer of the steering, it is further preferred if both a predicted trajectory based on the instantaneous steering angle as well as an optimal trajectory at the point in time of the transfer are displayed to the driver. The representation of the trajectory may be made, for example, two-dimensionally in a top view on a display device, for example, the monitor of a navigation system. A separate display device is also possible. As a result of the representation of the predicted trajectory based on the steering angle, the driver sees the direction the vehicle would move into if the steering angle is not changed. The display of the optimal trajectory indicates to the driver how to best continue to move the vehicle without endangering the surroundings.

To be able to continue to move the vehicle along the optimal trajectory after the steering is transferred to the driver, it is further advantageous if the driver receives information of how to reach the optimal trajectory at the point in time after the transfer of the steering. This information may be provided visually, acoustically or haptically. Visual or haptic information is preferred. Visual information may, for example, be provided by displaying arrows showing the direction in which the steering wheel must be moved to reach the trajectory. A torque applied to the steering wheel that guides the driver in moving the steering wheel in the correct direction is suitable, for example, as haptic information. In this connection, the driver of the vehicle is, however, free not to follow the optimal trajectory predefined by the system but instead to choose any other angle and continue to move the vehicle. This is, for example, necessary if the driver would like to turn the vehicle when maneuvering out of a parking space in order to travel in the opposite direction. In this case, it is necessary for the driver to take note of, in particular, objects in the surroundings of the vehicle, including in particular the traffic flow both in the direction of travel and in the opposite direction.

In particular for the case that the driving maneuver is a maneuver out of a parking space, it is further advantageous if roadway information for identifying one-way streets or streets having multiple lanes in one direction is utilized. This makes it possible to avoid unnecessary warnings. In the case of one-way streets, it is in principle to be assumed that no oncoming traffic exists. In the case of roadways having multiple lanes, the risk that the vehicle will enter the opposite lane when making an abrupt entry into the traffic flow is also lower than in the case of only one lane in each direction. In the case of multiple lanes or one-way streets, particular note must be taken of the traffic flow and it must be monitored whether other vehicles are approaching.

To ensure that in the case of continued travel along the predicted trajectory based on the instantaneous steering angle, a risk of a collision with objects in the vehicle's surroundings is present, it is preferred that an automatic emergency braking action is carried out when the vehicle moves along the predicted trajectory based on the steering angle after transfer to the driver and when an object is detected, with which the vehicle would collide if the direction is not changed. The automatic emergency braking action makes it possible to bring the vehicle to a stop in good time before a collision with the approaching object and to prevent a collision in this way. For the case that an emergency braking action is necessary, it is further advantageous if the driver is informed concerning the impending emergency braking action. This may, for example, be provided visually. Alternatively, it is also possible to first trigger a warning jolt by causing the vehicle to experience a brief change of acceleration and then to initiate the braking operation. The warning jolt may be implemented by initial braking followed by a brief acceleration. The information provided, for example, by the warning jolt, makes it possible for the driver to prepare for the imminent emergency braking action. If the emergency braking action is displayed visually, it is, for example, possible for a warning signal to light up, or corresponding information is provided in the display device. In this case, the display device is preferably the same one used to also display the trajectory.

The method according to the present invention is suitable in particular for driving maneuvers out of a parking space, in particular a longitudinal parking space which is situated parallel to a roadway. However, the method may also be used for maneuvering out of a perpendicular parking space or for any other driving maneuver, for example, driving on narrow streets.

A suitable device for carrying out the method includes an arrangement for steering the vehicle along a previously calculated trajectory as well as an arrangement for outputting information concerning the vehicle's surroundings and suitable steering settings to the driver before and/or during the transfer of the steering to the driver.

A suitable arrangement for steering the vehicle along a previously calculated trajectory includes, for example, a parking assistance control unit. This may be utilized for maneuvering out of a parking space or for carrying out any other driving maneuvers. Signals are then provided by the control unit to, for example, servomotors for the steering in order to steer the vehicle in such a way that it follows a trajectory calculated by the parking assistance control unit. In addition, information is also provided, for example, to an ESP (electronic stability program) control unit or any other control unit used to monitor the longitudinal guidance of the vehicle, i.e., the vehicle is accelerated and decelerated.

As already mentioned before, for example, a monitor, on which the vehicle and the trajectories as well as objects in the vehicle's surroundings are shown in a two-dimensional top view, is suitable as an arrangement for the output of information.

It is then also possible to output warnings to the driver on the monitor.

If objects are located in the vehicle's surroundings, it is possible to warn the driver. The warning may, for example, be provided visually. In the case of an adequately large distance, so that there is no risk of a collision with an object if the vehicle continues to move, it is, for example, possible to show the objects in green or select a green display, which shows the driver that no objects are in the vicinity of the vehicle. In the case of a continued approach which, however, still does not represent an acute endangerment, a yellow display is then preferred, for example, and in the case of a distance of the object at which continued travel would result in a collision, a red display is preferred. The selection of the colors green, yellow and red as a function of the level of endangerment is meaningful, since a road user associates these colors with the corresponding information. For example, the color red is generally selected if there is a risk of endangerment or the vehicle must be stopped immediately.

Exemplary embodiments of the invention are depicted in the FIGURE and will be explained in greater detail in the following description.

BRIEF DESCRIPTION OF THE DRAWING

The FIGURE shows a schematic representation of a vehicle maneuvering out of a parking space.

DETAILED DESCRIPTION

A vehicle maneuvering out of a longitudinal parking space is shown, for example, in the sole FIGURE.

The maneuver out of parking space 1 shown in the sole FIGURE is only to be understood as exemplary. In addition to the maneuver out of a parking space 1, the method according to the present invention may also be applied to any other driving maneuvers, for example, positioning maneuvers or other travel in tight surroundings when driving, for example, on narrow streets.

A parking space 1, which is designed as a longitudinal parking space, as shown in FIG. 1, generally includes a front delimitation 3 and a rear delimitation 5. Front delimitation 3 and rear delimitation 5 may, for example, be formed by additional parked vehicles. It is also possible for front delimitation 3 and/or rear delimitation 5 to be formed, for example, by a trough planter or a wall. Any other delimitation of parking space 1 is also possible. A curb is generally used as a lateral delimitation 7. In this case, for example, a sidewalk or also an unsurfaced section of terrain is located next to parking space 1. Furthermore, however, it is also possible for lateral delimitation 7 of the parking space to be formed by a barrier or a wall.

Depending on the type of front delimitation 3, of rear delimitation 5 and lateral delimitation 7, a trajectory for the maneuver of the vehicle out of the parking space is calculated, along which the vehicle may be moved out of the parking space. If lateral delimitation 7 is a curb which may easily be driven over by the vehicle, the trajectory may be calculated otherwise than if lateral delimitation 7 is a wall. In the case of a curb as a lateral delimitation, it may, for example, be driven over during the maneuver to leave a parking space, which is not possible in the case of a wall.

The trajectory for maneuvering vehicle 11 out of the parking space is calculated from the geometry of parking space 1, which is measured by sensors 9 on vehicle 11 maneuvering out of the parking space. Vehicle 11 is then moved along this trajectory. According to the exemplary embodiments and/or exemplary methods of the present invention, the maneuver out of a parking space is either fully automatic, i.e., both the longitudinal guidance and the lateral guidance of the vehicle are taken over by the driver assistance system, or semi-automatic, in which the lateral guidance is carried out automatically. The longitudinal guidance of the vehicle is in this connection the acceleration, maintenance of speed and deceleration of the vehicle as well as a change of direction of the vehicle; the lateral guidance relates to the steering of the vehicle.

Any sensors known to those skilled in the art, which may be used to detect the surroundings of vehicle 11, are suitable as sensors 9. Suitable sensors 9 are, for example, ultrasound sensors, infrared sensors, radar sensors or LIDAR sensors. Optical sensors, for example, cameras, may also be used for detecting the surroundings.

To take over the vehicle's lateral guidance, it is, for example, possible for signals to be sent from the driver assistance system to a servomotor, which takes over the steering of the vehicle. The longitudinal guidance of the vehicle may, for example, be taken over by an ESP (electronic stability program) control unit, which receives the appropriate signals from the driver assistance system. To this end, the driver assistance system has previously calculated the trajectory along which the vehicle must be moved and now takes over the steering along this trajectory.

After the automatic driving maneuver has been completed, for example, when a position is reached, along which the vehicle may be moved out of the parking space without endangering the surroundings, or even in the case of any other driving maneuver, after the driving maneuver is completed, it is necessary for the steering to be transferred back to the driver of vehicle 11. To prevent the vehicle from colliding with an oncoming vehicle 13, in particular in the case of a maneuver out of a parking space, due to the position of the steerable wheels caused by an abrupt acceleration by the driver, according to the exemplary embodiments and/or exemplary methods of the present invention, information concerning the surroundings of the vehicle and suitable steering settings are provided to the driver of vehicle 11. The information concerning the surroundings of the vehicle may, for example, be provided two-dimensionally in a top view, the own vehicle as well as objects in the surroundings being displayed to the driver in a display. The display may be provided as, for example, shown in FIG. 1. Information concerning suitable steering settings in order, for example, to avoid a collision with objects in the vehicle's surroundings, in particular with oncoming vehicles 13, may be provided, for example, by displaying a steering wheel having directional arrows showing the direction in which the steering wheel must be moved.

Furthermore, it is advantageous if both a predicted trajectory 15, along which the vehicle moves with an unchanged steering angle, as well as an optimal trajectory 17, along which the vehicle should move to avoid a possible collision with an oncoming vehicle 13, are displayed.

In the specific embodiment represented here, the vehicle would continue to move straight ahead into the oncoming traffic if the steering angle is unchanged. In the case of another setting of the front wheels, it might also be the case, for example, that the vehicle would directly make an arc into the oncoming traffic. Also, a movement already in the direction of travel, but with a steeper angle than along optimal trajectory 13, is possible.

In order to drive along optimal trajectory 17, it is necessary that the vehicle is steered by the driver accordingly. Generally, the actual path of the vehicle will lie between predicted trajectory 15 and optimal trajectory 17, since the driver already covers a short distance during the steering in the direction of optimal trajectory 17. Alternatively, however, it is also possible that the driving maneuver is completed when the steerable wheels are already steered in the direction of the optimal trajectory. In this case also, however, information to the driver is necessary for him to countersteer in time to prevent the risk of a collision with the vehicle forming front delimitation 3 through, for example, an arc. Thus, it is, for example, possible that in the case of a too fast start after the front wheels have already been turned, an arc is traveled which results in a collision with the side of the vehicle forming front delimitation 3. To avoid this, it is therefore preferred that the transfer of the steering is made after the wheels have been aligned straight ahead. The predicted trajectory and the optimal trajectory then follow a course as represented by numerals 15 and 17 in FIG. 1.

In the specific embodiment shown here, predicted trajectory 15 and optimal trajectory 17 are shown as tracks of the steerable wheels. In addition to such a representation, it is alternatively also possible to represent the trajectory as a simple line, the trajectory being, for example, the distance covered by the center point of the rear axle. In this case, the representation of the trajectory would accordingly show the path of the center point of the rear axle.

If there is a risk of a collision with an oncoming vehicle 13 in the case of travel with the steerable wheels continuously remaining turned, or in the case the travel does not follow the optimal trajectory, it is preferred to warn the driver. In this connection, the warning may, for example, be provided visually, acoustically and/or haptically. A visual warning may, for example, be provided by lighting up a warning light.

Alternatively, it is also possible, for example, to highlight oncoming vehicle 13 in color in the two-dimensional display. An acoustical warning may, for example, be provided by an audio warning signal such as has already been used in distance-measuring systems. A suitable haptic warning is, for example, a warning jolt, which is provided by an abrupt change in acceleration. In this connection, it is, for example, possible to accelerate the vehicle briefly and immediately decelerate it again, or alternatively, to decelerate and then interrupt the braking operation briefly to produce a jolt. To rule out a collision with an oncoming vehicle 13, it is further advantageous to carry out an emergency braking action if unchanged continued travel of the vehicle would result in a risk of collision with an approaching object. In this case, it is also advantageous if the driver is warned before the emergency braking action is carried out. In this connection, the warning may also be provided visually, acoustically and/or haptically. In this case also, a visual warning provided by a display and a haptic warning provided, for example, by a warning jolt are preferred.

Depending on the endangerment, for example, that of a possible collision, it is possible to display objects in the surroundings of vehicle 11 in different colors. It is thus possible, for example, to display objects in green, for which there is no risk of collision if the vehicle continues to travel along a predicted trajectory or along the corresponding direction resulting from the steering by the driver. If a possible endangerment exists if continued travel is not changed, these vehicles are highlighted in color, for example, yellow. If the surroundings are directly endangered, for example, by a collision, these objects may be displayed, for example, in red. In this way, the driver receives information whether continued travel along the trajectory provided by him will lead to an endangerment of the surroundings, for example, a collision. In this connection, the color green means that no risk of endangerment of the surroundings is present, the color yellow means that increased attention on the part of the driver is required, and red means that a collision with an object is imminent.

In addition to the representation in two-dimensional form and highlighting of the individual objects, it is of course possible to select another representation as an alternative. It is, for example, also possible to provide only warning lights or warning displays, which light up in a different color depending on the endangerment.

What is claimed is:

1. A method for assisting a driver of a vehicle in a driving maneuver, the method comprising:
    performing one of (i) guiding the vehicle automatically along a previously calculated trajectory, and (ii) performing automatically a lateral guidance for travel along the trajectory;
    after the driving maneuver is completed, returning the steering of the vehicle to the driver; and
    providing information concerning the vehicle's surroundings and suitable steering settings to the driver at least one of before and during the transfer of the steering to the driver, wherein the driver receives a warning if the steering angle selected by the driver during the transfer of the steering would result in endangering the surroundings.

2. The method of claim 1, wherein the driving maneuver is a maneuver of leaving a parking space.

3. The method of claim 1, wherein the driver is informed when the transfer of the steering takes place.

4. The method of claim 1, wherein a predicted trajectory based on the steering angle and an optimal trajectory at the point in time of the transfer are displayed to the driver.

5. The method of claim 1, wherein the driver receives information at the point in time of the transfer of the steering as to how to reach the optimal trajectory.

6. The method of claim 1, wherein roadway information for identifying one-way streets or streets having multiple lanes in one direction is used for avoiding unnecessary warnings.

7. The method of claim 1, wherein when a vehicle is moved along the trajectory predicted based on the steering angle after transfer to the driver, and wherein if an object is detected with which the vehicle would collide if the direction is not changed, an automatic emergency braking action is performed.

8. The method of claim 1, further comprising:
    a steering arrangement to steer the vehicle along a previously calculated trajectory; and
    an outputting arrangement to output information concerning the vehicle's surroundings and suitable steering settings to the driver at least one of before and during the transfer of the steering to the driver.

9. The method of claim 8, wherein the steering arrangement to steer the vehicle along a previously calculated trajectory includes a parking assistance control unit.

10. The method of claim 8, wherein the outputting arrangement to output information includes a monitor, and wherein a two-dimensional top view of the vehicle and trajectories and objects in the vehicle's surroundings are displayable on the monitor.

* * * * *